E. WEBSTER.
Gridiron.
No. 27,176.
Patented Feb. 14, 1860.
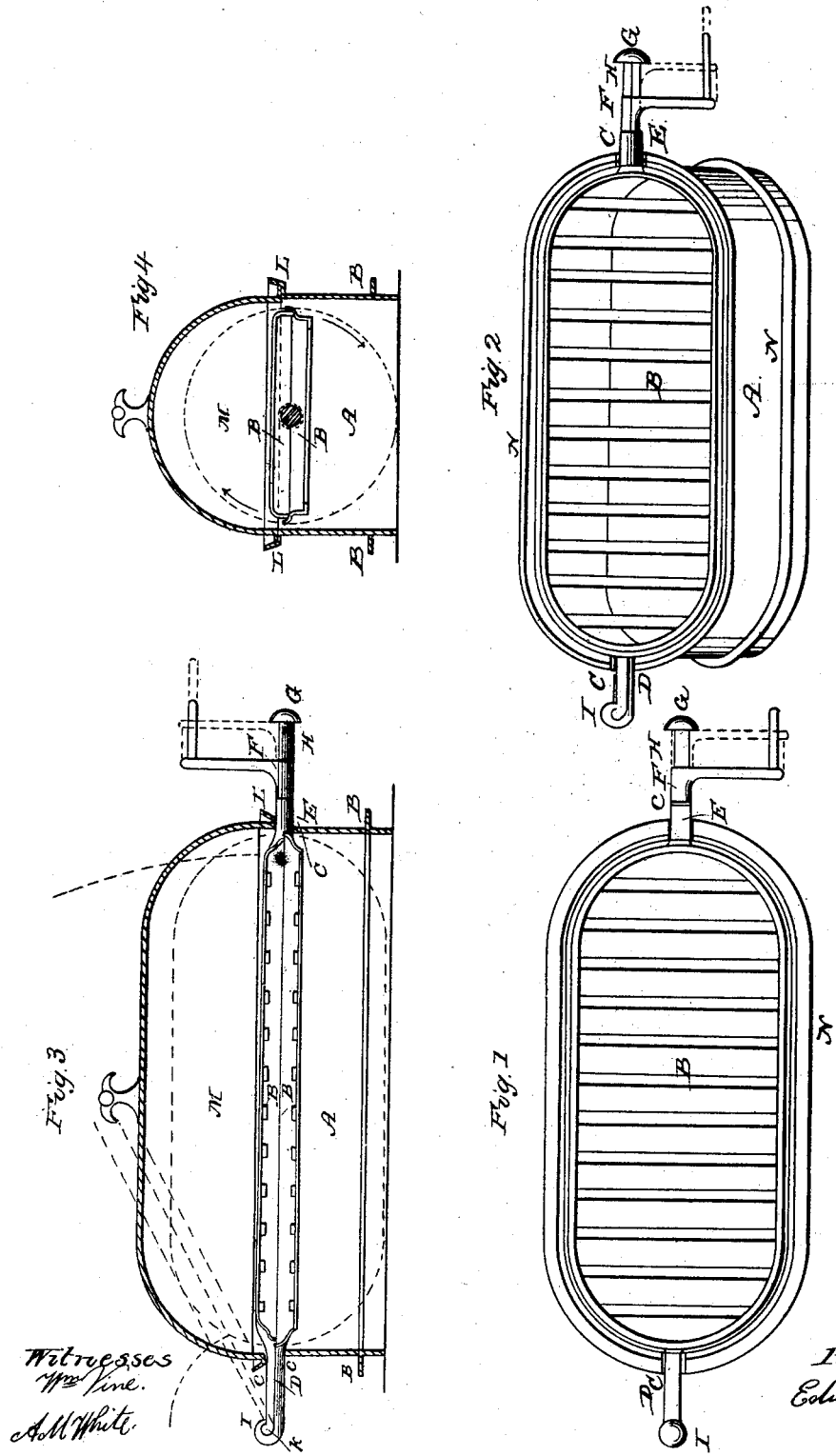

UNITED STATES PATENT OFFICE.

EDWARD WEBSTER, OF HARTFORD, CONNECTICUT.

GRIDIRON.

Specification of Letters Patent No. 27,176, dated February 14, 1860.

*To all whom it may concern:*

Be it known that I, EDWARD WEBSTER, of the city of Hartford, county of Hartford, and State of Connecticut, have invented new and useful Improvements in the Mode of Constructing Revolving Gridirons or Meat-Broilers; and I do hereby declare that the following is a correct description thereof, reference being had to the accompanying drawing and to the letters of reference marked thereon.

The nature of my invention consists in a revolving gridiron or meat broiler in combination with a frame to receive the same to fit in the opening of a stove or elsewhere.

To enable others skilled in the art to make and use my invention I will proceed to describe the construction and operation of the same.

The drawing Figure 1 is a plan view of the broiler and frame. Fig. 2 is a side view. Fig. 3 is a longitudinal section. Fig. 4 is a transverse section.

I construct the frame A of thin metal of a suitable size and form to receive the revolving folding or double gridiron or broiler B, to be used on the top of a stove or elsewhere. The flange N, projects from the sides to support the frame when used in the opening of a stove; on the top edge of the frame is another projecting flange L, with the outer edge turned up to form a check to prevent the top or cover M, from sliding off. At each end of the frame is a notched bearing C, to receive, and for the stems D and E' to revolve on.

I make my gridiron or broiler of an oval or other form, in two halves as shown in drawing Fig. 3, separating in the center longitudinally and corresponding with the shape of the frame A. Each of the halves contains an equal number of bars to receive the meat to be broiled.

A stem at each end D—E is attached to each half and work and revolve on the bearings C of the frame A. These stems are divided in two halves one half to each of the parts of the gridiron. The stem at one end D, is formed with a sort of knob I, and a notch to receive a corresponding hook K, to fasten the two together and to allow them to move with the separation of the two halves. The other end E', is formed with a square part to receive the socketed part of the crank handle F. The extreme end of this stem E has a flat knob G as a stop to the slide of the crank F when it is passed on to the solid square part H of the stem E to allow of the two halves of the broiler to be separated when required to place the meat between them, and when the meat is placed between the two halves are brought together, the end D being hooked in the notch of the knob I. The crank handle socket F slides over the two halves E of the stem, which is divided up to the solid part H, and holds the whole permanently together, ready for revolving.

The top or cover M is composed of tin and made to fit in the rabbet formed by the upper flange L, of the frame as shown in Fig. 3 and 4 and when in operation acts as a reflector as well as a cover. The rabbet is also suitable to receive a griddle, the same being made a little short at each end to allow the escape of steam, the cover acting as a retainer of heat if required.

The utility of my revolving broiler and frame and cover is that the same can be so easily and conveniently turned, when the gravy begins to run downward into the fire, reversing the underside, to the top, thus the gravy which runs down will run again into the meat, keeping it always moist till done and retain it afterward.

What I claim as my invention and desire to secure by Letters Patent is—

The folding and revolving broiler, in the manner as herein described, in combination with the frame and cover, substantially as herein described and for the purpose set forth.

EDWARD WEBSTER.

In presence of—
GEO. S. GILMAN,
WM. VINE.